June 17, 1924.
W. A. WELBOURN
TRAP
Filed July 24, 1922
1,497,816
2 Sheets-Sheet 1
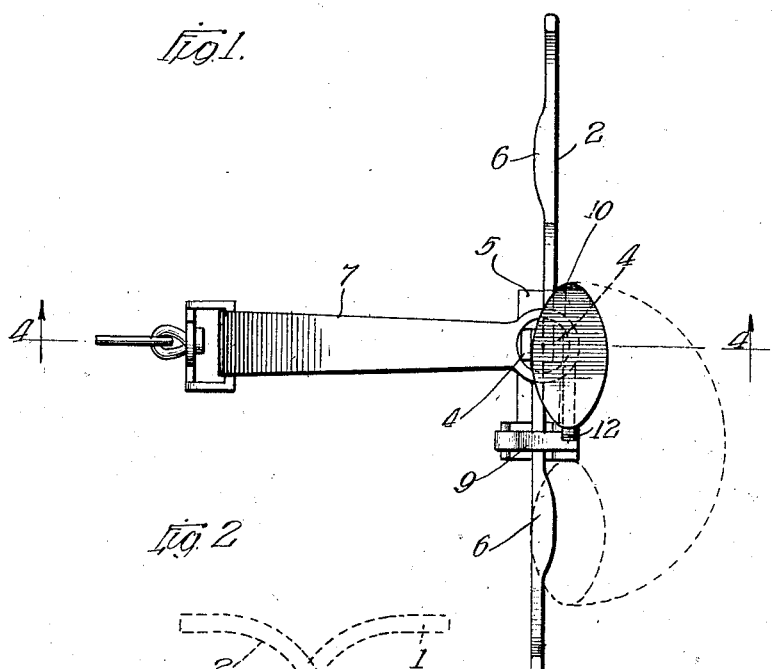
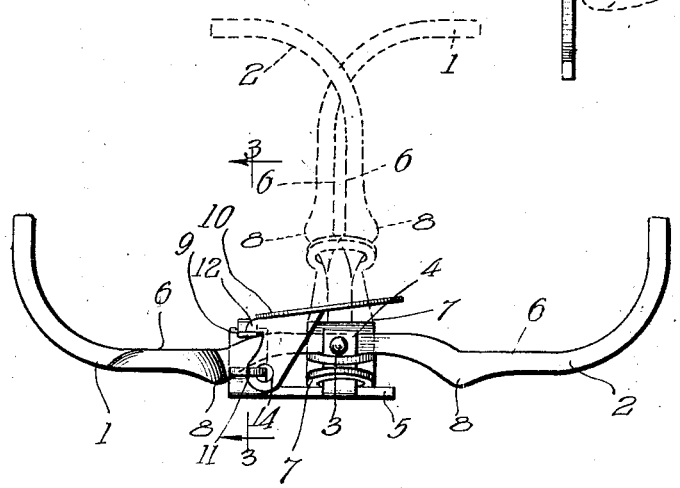
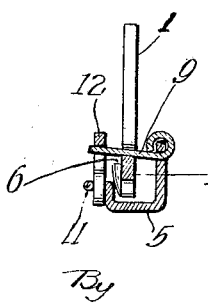
Witnesses:
Harry B. White
W. F. Kilroy
Inventor:
William A. Welbourn
By Hill & Hill Attys.

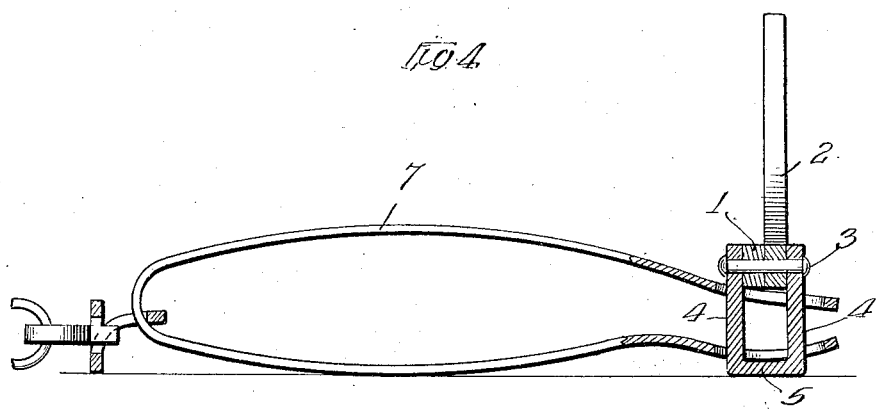
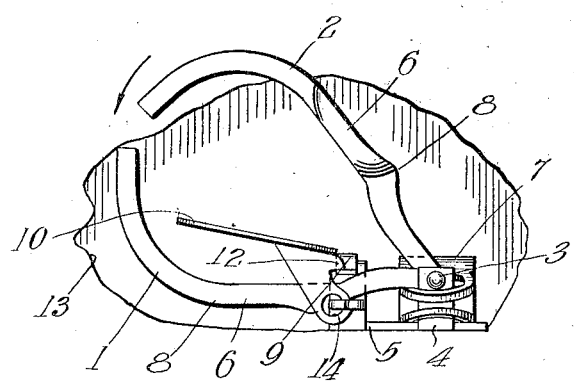
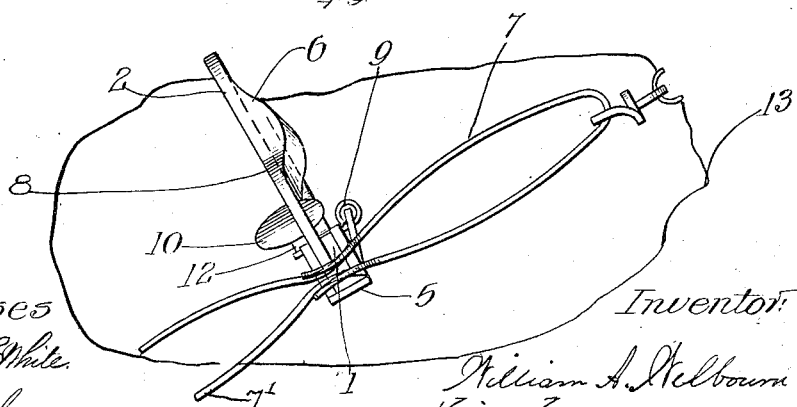

Patented June 17, 1924.

1,497,816

UNITED STATES PATENT OFFICE.

WILLIAM A. WELBOURN, OF SUMMIT, ILLINOIS.

TRAP.

Application filed July 24, 1922. Serial No. 577,079.

*To all whom it may concern:*

Be it known that I, WILLIAM A. WELBOURN, a citizen of the United States, residing at Summit, in the county of Cook and State of Illinois, have invented certain new and useful Improvements in Traps, of which the following is a description.

My invention relates to improvements in traps, and more particularly to traps used for catching various sizes of animals such as bear, lynx, muskrat, mink or the like.

The invention has among its objects the production of a device of the kind described which is simple, convenient, compact, durable, reliable, efficient and satisfactory for use wherever found applicable.

One of the objects of my invention is to provide a trap of the kind described which, when sprung, will clamp the animal about the body between a pair of jaws so as to squeeze it and without injury to its fur; and reliably prevent its escape.

Another object of my invention is to provide a trap of the kind described which is operable in either of two positions, as desired.

Many other objects and advantages of the construction herein shown and described will be obvious to those skilled in the art from the disclosures herein given.

To this end my invention consists in the novel construction, arrangement and combination of parts herein shown and described and more particularly pointed out in the claims.

In the drawings, wherein like reference characters indicate like or corresponding parts, Fig. 1 is a top plan view of the trap in its set position;

Fig. 2 is a front elevation thereof in set position;

Fig. 3 is a sectional view taken substantially on the line 3—3 of Fig. 2;

Fig. 4 is a sectional view taken substantially on the line 4—4 of Fig. 1;

Figs. 5 and 6 are front and side elevations of the trap as set in its other position.

In the drawings, wherein I have illustrated the preferred embodiment of my invention, 1 and 2 indicate the arms or jaws of the trap, these arms being of any desired size and material, preferably of the shape shown, and preferably both of them being identical, so as to be interchangeable. These jaws are pivotally connected together only at their lower ends by a pin 3 or the like, and are mounted between the arms 4, of a bracket member or base 5. Intermediate their ends each of the jaws 1 and 2, are preferably provided with a laterally offset enlargement or abutment 6, flattened on its face so that when the jaws 1 and 2 are brought together these abutments will form stops to engage each other on their flat faces and prevent further movement of the jaws past one another, and maintain the lower portions of said jaws substantially in alignment, as shown in dotted lines in Fig. 2. Equivalent means for the same purpose may be employed.

A suitable spring member 7 is loosely arranged with its legs intermediate the base member 5 and the jaws 1 and 2, so as to forcibly urge said jaws together. It will be noted that the legs of the spring 7 loosely encircle and lock the lower portions of the jaws together when in their registering position, as shown in dotted lines in Fig. 2, the spreading movement of the legs of the spring being limited by the heel portions 8 of the jaws 1 and 2.

A bar or latch 9 or its equivalent for the purpose is pivotally mounted at one end upon the base member 5, as shown most clearly in Fig. 3, and is adapted to engagingly overlie one of the jaw members, as for instance the member 1, when the jaws are in their set position.

A trencher pan or plate 10 is loosely pivoted at 14 to an eye 11, arranged on the bracket or base member 5 the same having a latch portion or shoulder 12 to overlie and engage the free end of the bar 9. The eye member 11, see Figs. 2 and 5, is preferably formed by providing a pair of short spaced arms on the base member, adapted to be inserted through the aperture 14 provided on the trencher member 10, and the outer or free ends of the arms brought together to prevent the accidental disengagement of the trencher member therefrom. It is obvious that when the trap is in the set position with the trencher pan overlying the bar 9, that the spring 7 exerts a pressure upwardly of the arms, tending to move them toward one another, this pressure being transmitted to the bar 9, which is prevented from lifting by means of the trencher pan's engagement therewith. Obviously any weight or pressure brought to bear on the trencher pan will release the bar 9 and cause the jaws to fly toward each other to clamp an animal therebetween. The trencher pan 10 is preferably tapered in width at its free end and in the modification shown in Figs. 1 to 4 inclusive the pan is arranged parallel or longitudinally of the jaws 1 and 2. The trencher is pivotally mounted and may be arranged at any preferred angle relative to the jaws, as indicated in dotted lines in Fig. 1.

In the arrangement shown in Figs. 5 and 6, the trap is preferably dropped into an animal's hole or runway 13, with one jaw, as for instance jaw 1, entirely below the top of the hole, while the jaw 2 is brought toward the other jaw so that its free end is closely adjacent the top of the hole. Friction or other suitable means serve to cause the jaw 2, to remain in such set position. In this position in the preferable mode of setting, an animal must insert its body, or a portion thereof, past and between said jaws to reach the trencher pan 10. The pan 10 in the present instance is preferably arranged longitudinally of or parallel to the jaws 1 and 2 or at any preferred angle thereto because as the trencher is pivotally supported, it may be arranged at such angle as is preferred. As soon as the trencher pan is stepped on by the animal the spring snaps the jaws together permitting the jaws to close about the animal. If it is desired to do so, an auxiliary spring 7' may be arranged to supplement the action of the spring 7, as shown in Fig. 6, similar to that generally employed in bear traps and traps for larger animals.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, an animal trap comprising a base having a movable latch member thereon, a pair of jaws carried by said base and movable toward each other, means forcibly urging said jaws together, a pan secured to said base, and means on said pan arranged to latch with said latch member for setting said pan in a plurality of different positions to releasably hold said jaws apart.

2. In a device of the kind described and in combination, a pair of pivotally interconnected jaws curved toward each other at their free ends, said jaws provided with abutments intermediate their ends to limit their movement past one another, means resiliently forcing said jaws together, a pivotally-mounted bar positioned to transversely overlie and engage one of said jaws, and a pivotally mounted trencher pan adjustable either transversely or longitudinally of the last-mentioned jaw to releasably engage with and control said pivotally-mounted bar.

3. In a device of the kind described and in combination, a trap comprising a base member, a pair of jaws pivotally mounted thereon adjacent one another, said jaws curved toward one another at their free ends and each provided with oppositely offset flat abutments intermediate its ends, whereby said jaws will engage at said abutments to form a stop to limit their movement past one another, a spring loosely mounted intermediate said base and jaws to urge said jaws together to clamp an object therebetween, a bar pivotally mounted on said base to overlie one of said jaws laterally thereof, and a trencher pan pivotally connected to said base member and tapered in width at its free end to releasably engage with said bar when arranged either longitudinally or laterally of said jaws.

4. In a device of the kind described and in combination, a trap comprising a base member, a pair of jaws pivotally mounted thereon provided with oppositely offset abutments intermediate their ends to limit their movement past one another, a spring mounted intermediate said base and jaws to urge said jaws together to clamp an object therebetween, a bar pivotally mounted on said base to transversely overlie one of said jaws, and a trencher pan pivotally connected to said base member to releasably engage with said bar when arranged either longitudinally or laterally of said jaws.

In testimony whereof, I have hereunto signed my name in the presence of two subscribing witnesses.

WILLIAM A. WELBOURN.

Witnesses:
JOHN W. HILL,
RUTH M. EPHRAIM.